United States Patent
Wright et al.

(10) Patent No.: US 7,465,512 B2
(45) Date of Patent: *Dec. 16, 2008

(54) SOLID OXIDE FUEL CELL STACK

(75) Inventors: Gary Wright, Derby (GB); Nigel T Hart, Derby (GB); Gerard D Agnew, Derby (GB); Christopher Burrows, Burton on Trent (GB)

(73) Assignee: Rolls-Royce plc, London (GB)

( * ) Notice: Subject to any disclaimer, the term of this patent is extended or adjusted under 35 U.S.C. 154(b) by 526 days.

This patent is subject to a terminal disclaimer.

(21) Appl. No.: 10/954,304

(22) Filed: Oct. 1, 2004

(65) Prior Publication Data

US 2005/0074661 A1 Apr. 7, 2005

(30) Foreign Application Priority Data

Oct. 3, 2003 (GB) ................................. 0323224.6

(51) Int. Cl.
*H01M 8/10* (2006.01)
*H01M 2/00* (2006.01)

(52) U.S. Cl. ............................. 429/32; 429/34; 429/38

(58) Field of Classification Search ................... 429/32, 429/30, 34, 38, 19

See application file for complete search history.

(56) References Cited

U.S. PATENT DOCUMENTS

2003/0186100 A1* 10/2003 Vora et al. .................... 429/31
2004/0166390 A1* 8/2004 Agnew et al. ................. 429/32
2005/0019635 A1* 1/2005 Arroyo et al. ................. 429/32

FOREIGN PATENT DOCUMENTS

| JP | 07 094196 A | 4/1995 |
|----|-------------|--------|
| JP | 7335232 A | 12/1995 |
| WO | WO 02/089242 A | 11/2002 |
| WO | WO 03/010847 A | 2/2003 |
| WO | WO 010847 A | 2/2003 |

OTHER PUBLICATIONS

Abstract of WO publication WO 03-043117, Arroyo et al, "Method for making a fuel cell with large active surface and reduced volume", May 22, 2003.*

* cited by examiner

*Primary Examiner*—Raymond Alejandro
(74) *Attorney, Agent, or Firm*—W. Warren Taltavull; Manelli Denison & Selter PLLC

(57) ABSTRACT

A fuel cell stack comprises a plurality of modules and each module comprises an elongate hollow member and one passage extending through the hollow member for the flow of a reactant. Each hollow member has a first flat surface and a second flat surface. At least one of the modules includes a plurality of fuel cells arranged on at least one of the first and second flat surfaces. Each module has a first and second integral feature to provide a spacer and a connection with its adjacent modules. The first integral feature comprises a third flat surface and the second integral feature comprises a fourth flat surface. The third flat surface is arranged at an intersecting angle to the first flat surface and the fourth flat surface is arranged at an intersecting angle to the second flat surface.

16 Claims, 3 Drawing Sheets

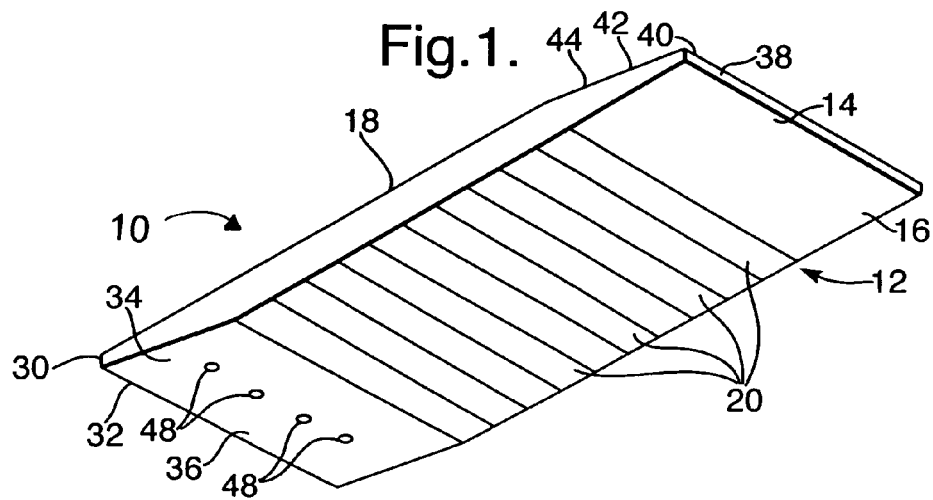
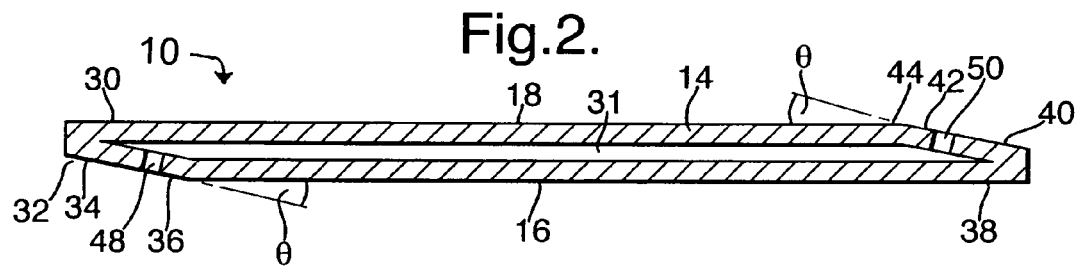
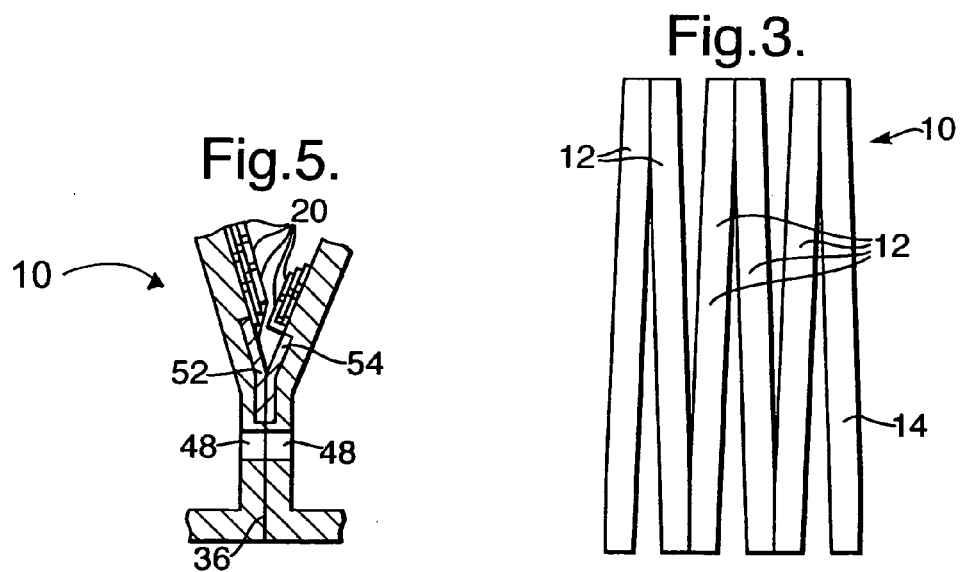

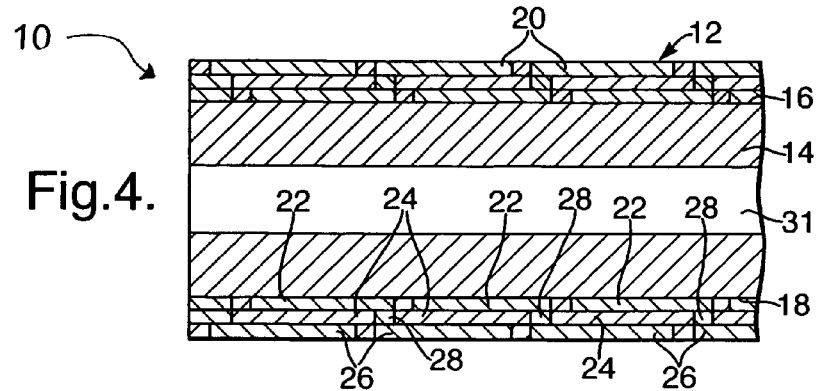
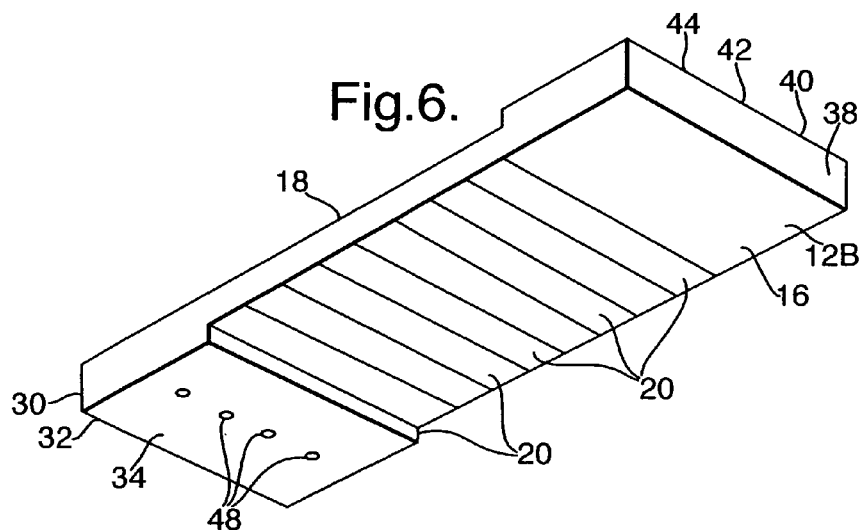
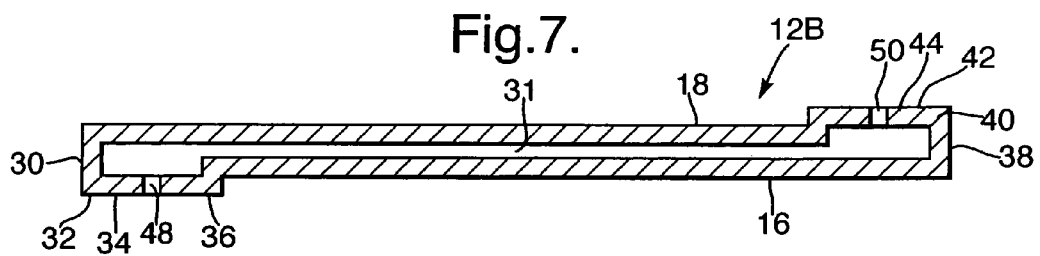
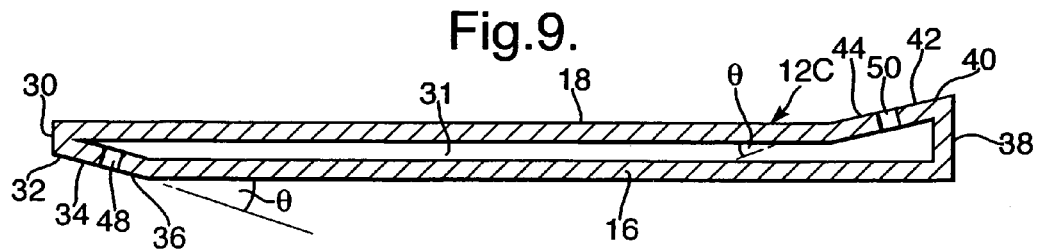

SOLID OXIDE FUEL CELL STACK

FIELD OF THE INVENTION

The present invention relates to a module for a fuel cell stack and in particular to a module for a solid oxide fuel cell stack.

BACKGROUND OF THE INVENTION

It is known from published International patent application WO03010847A2 to provide a plurality of modules for a fuel cell stack in which each module comprises a hollow member. Each hollow member has at least one passage extending longitudinally through the hollow member for the flow of a reactant. Each hollow member has two parallel flat surfaces and at least one of the modules has a plurality of fuel cells arranged on the flat surfaces of the modules. The end of one module is connected to an end of an adjacent module to allow reactant to flow sequentially through the modules.

In WO03010847A2 spacer members are provided at the ends of the adjacent modules to provide a connection for the flow of reactant from one module to the next, without leaks, and to space apart the flat surfaces of the modules. The spacer members are generally T-shaped or W-shaped in cross-section.

A problem with this arrangement is that additional spacer members are required to fluidly connect and space apart the adjacent modules.

SUMMARY OF THE INVENTION

Accordingly the present invention seeks to provide a novel module for a fuel cell stack, which reduces, and preferably overcomes, the above-mentioned problem.

Accordingly the present invention provides a module for a fuel cell stack, the module comprises an elongate hollow member, the module has at least one passage extending longitudinally through the hollow member for the flow of a reactant, the hollow member has a first flat surface and a second flat surface arranged substantially parallel to the first flat surface and at least one end of the module has a first integral feature to provide a spacer with an adjacent module, the first integral feature comprises a third flat surface arranged such that it is non coplanar with the first flat surface.

Preferably the first integral feature provides a connection with the adjacent module.

Preferably a second end of the module has a second integral feature to provide a spacer with another adjacent module, the second integral feature comprises a fourth flat surface arranged such that it is non coplanar with the second flat surface.

Preferably the second integral feature provides a connection with the other adjacent module.

Preferably the fourth flat surface is arranged parallel to the third flat surface.

Preferably the third flat surface is arranged at an intersecting angle to the first flat surface and the fourth flat surface is arranged at an intersecting angle to the second flat surface.

Preferably the first end decreases in thickness between the second flat surface and the third flat surface.

Preferably the first end decreases in thickness between the second flat surface and the third flat surface and the second end decreases in thickness between the first flat surface and the fourth flat surface.

Alternatively the second end increases in thickness between the first flat surface and the fourth flat surface.

Preferably the intersecting angle is between 5° and 20°, more preferably the intersecting angle is between 10° and 15°.

Alternatively the third flat surface is arranged parallel to the first flat surface and the fourth flat surface is arranged parallel to the second flat surface.

Preferably a plurality of fuel cells are arranged on the first and second flat surfaces.

Preferably the fuel cells are solid oxide fuel cells.

Alternatively a reforming catalyst may be provided in the at least one passage or on the first and second flat surfaces.

The present invention also provides a fuel cell stack comprises a plurality of modules, each module comprises an elongate hollow member, each module has at least one passage extending longitudinally through the hollow member for the flow of a reactant, each hollow member has a first flat surface and a second flat surface arranged substantially parallel to the first flat surface, at least one of the modules includes a plurality of fuel cells, the fuel cells are arranged on at least one of the first and second flat surfaces of the at least one module and at least one end of at least one of the modules has a first integral feature to provide a spacer with an adjacent module, the first integral feature comprises a third flat surface arranged such that it is non coplanar with the first flat surface.

Preferably at least one end of each of the modules has a first integral feature to provide a spacer with an adjacent module, the first integral feature comprises a third flat surface arranged such that it is non coplanar with the first flat surface.

Preferably the first integral feature provides a connection with the adjacent module.

Preferably a second end of the at least one module has a second integral feature to provide a spacer with another adjacent module, the second integral feature comprises a fourth flat surface arranged such that it is non coplanar with the second flat surface.

Preferably a second end of each module has a second integral feature to provide a spacer with another adjacent module, the second integral feature comprises a fourth flat surface arranged such that it is non coplanar with the second flat surface.

Preferably the second integral feature provides a connection with the other adjacent module.

Preferably the fourth flat surface is arranged parallel to the third flat surface.

Preferably the third flat surface is arranged at an intersecting angle to the first flat surface and the fourth flat surface is arranged at an intersecting angle to the second flat surface.

Preferably the first end decreases in thickness between the second flat surface and the third flat surface.

Preferably the first end decreases in thickness between the second flat surface and the third flat surface and the second end decreases in thickness between the first flat surface and the fourth flat surface.

Alternatively the second end increases in thickness between the first flat surface and the fourth flat surface.

Preferably the intersecting angle is between 5° and 20°, more preferably the intersecting angle is between 10° and 15°.

Alternatively the third flat surface is arranged parallel to the first flat surface and the fourth flat surface is arranged parallel to the second flat surface.

Preferably adjacent modules are connected to allow reactant to flow sequentially through the modules.

Alternatively adjacent modules are connected to allow reactant to flow in parallel through the modules.

Preferably the fuel cells are solid oxide fuel cells.

At least one of the modules may have a reforming catalyst provided in the at least one passage or on the first and second flat surfaces.

Alternatively all of the modules have fuel cells.

BRIEF DESCRIPTION OF THE DRAWINGS

The present invention will be more fully described by way of example with reference to the accompanying drawings in which:

FIG. 1 is a perspective view of a module for a fuel cell stack according to the present invention.

FIG. 2 is a longitudinal cross-sectional view through the module shown in FIG. 1.

FIG. 3 is an end view of a fuel cell stack comprising a plurality of modules shown in FIGS. 1 and 2.

FIG. 4 is a cross-sectional view through the module shown in FIGS. 1 and 2 showing the fuel cells.

FIG. 5 is a part cross-section view showing the electrical interconnectors between modules.

FIG. 6 is a perspective view of an alternative module for a fuel cell stack according to the present invention.

FIG. 7 is a longitudinal cross-sectional view through the module shown in FIG. 6.

FIG. 9 is a longitudinal cross-sectional view through an alternative module according to the present invention.

DETAILED DESCRIPTION OF THE INVENTION

Figure 8:
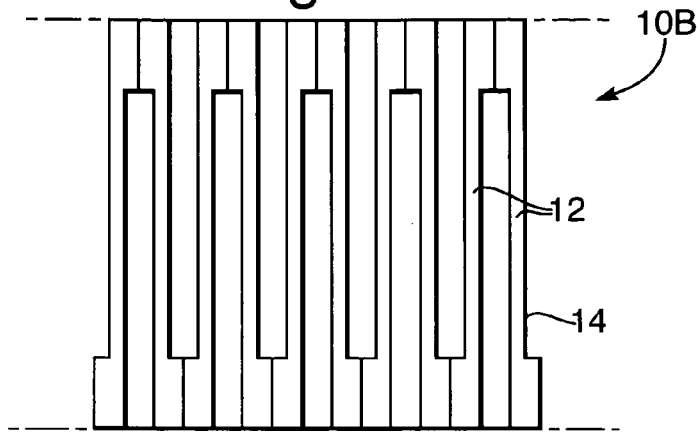
FIG. 8 is an end view of a fuel cell stack comprising a plurality of modules shown in FIGS. 6 and 7.

A solid oxide fuel cell stack 10 according to the present invention is shown in FIGS. 1 to 5. The solid oxide fuel cell stack 10 comprises a plurality of modules 12 arranged within a casing (not shown). Each module 12 comprises an elongate hollow member 14. The hollow members 14 are manufactured from fully or partially stabilised zirconia, alumina, silicon carbide, magnesia doped magnesia aluminate or other suitable ceramic material. Each hollow member 14 has two flat parallel surfaces 16 and 18 upon which, are arranged solid oxide fuel cells 20. The hollow members 14 are porous, or have apertures, to allow fuel to flow to the solid oxide fuel cells 20.

The solid oxide fuel cells 20 are spaced apart longitudinally along the surfaces 16 and 18 and the solid oxide fuel cells 20 on each of the surfaces 16 and 18 are electrically connected in series.

Each solid oxide fuel cell 20 comprises an anode electrode 22, a solid oxide electrolyte 24 and a cathode electrode 26. The anode electrodes 22 of all but one of the fuel cells 22, on each of the surfaces 16 and 18, are electrically connected to the cathode electrode 26 of an adjacent solid oxide fuel cell 18 by a respective one of a plurality of interconnectors 28.

Each hollow member 14 has one or more passages 31 extending longitudinally through the hollow member 14, for the supply of fuel to the solid oxide fuel cells 20. The fuel diffuses, or flows, through the hollow members 14 to the anode electrodes 22 of the solid oxide fuel cells 20. The passages 31 in each hollow member 14 have a uniform cross-sectional area throughout its length.

A first end 30 and a first side 32 of the module 12 has a first feature 34 to provide a spacer and a fluid connection with an adjacent module 12 and a second end 38 and a second side 40 of the module 12 has a second feature 42 to provide a spacer and a fluid connection with another adjacent module 12. The first feature 34 comprises a third flat surface 36 and the second feature 42 comprises a fourth flat surface 44 arranged parallel to the third flat surface 36. The third flat surface 36 is arranged at an intersecting angle θ to the first flat surface 16 and the fourth flat surface 44 is arranged at an intersecting angle θ to the second flat surface 18. The intersecting angle θ is between 5° and 20°. Preferably the intersecting angle θ is between 10° and 15°. The third flat surface 36 of one module 12 is arranged to abut the fourth flat surface 44 of an adjacent module 12. The third flat surface 36 of one module 12 has one or more apertures 48 arranged to align with corresponding apertures 50 in the fourth flat surface 44 of the adjacent module 12. The third flat surface 36 of one module 12 has an electrical interconnector 52 to electrically connect an electrical interconnector 54 at the fourth flat surface 44 of the adjacent module 12 to electrically connect the solid oxide fuel cells 20 in electrical series.

Thus each module 12 is arranged such that the surfaces 16 and 18 of the hollow member 14 are substantially parallel and spaced apart. The modules 12 are arranged such that the surfaces 16 and 18 of adjacent modules 12 are spaced apart. Additionally, it is to be noted that the modules 12 are arranged to form an undulating arrangement of modules 12. Thus it is clear that the fuel flows sequentially through the modules 12 from a fuel supply manifold to a fuel removal manifold through a serpentine flow path as shown in FIG. 3.

Additionally air, or oxygen, flows through the space between the modules 12 in a direction perpendicular to the longitudinal direction of the modules 12.

The hollow members may be produced by extruding, injection moulding, near net shape techniques, casting or forging. The hollow members may also comprise metals or polymers.

The advantage of the present invention is that there is a reduction in the number of parts of the fuel cell stack, because the separate spacer members are dispensed with. There is a reduction of interfaces within the fuel cell stack. There is a high packing density of the fuel cells. The ability to withstand thermal gradients and thermal cycling is maintained.

An alternative fuel cell stack 10B is shown in FIGS. 6 to 8 and like parts are denoted by like numerals. Again the first end 30 and a first side 32 of the module 12B has a first feature 34 to provide a spacer and a fluid connection with an adjacent module 12 and a second end 38 and a second side 40 of the module 12 has a second feature 42 to provide a spacer and a fluid connection with another adjacent module 12. The first feature 34 comprises a third flat surface 36 and the second feature 42 comprises a fourth flat surface 44 arranged parallel to the third flat surface 36. The embodiment in FIG. 6 to 8 differs in that the third flat surface 36 is arranged parallel to the first flat surface 16 and the fourth flat surface 44 is arranged parallel to the second flat surface 18.

In this arrangement the reactant may flow sequentially through the modules or in parallel through the modules from inlet and outlet manifolds at the ends of the modules.

This arrangement also has advantages of maintaining a gap between the modules with an inlet manifold and an outlet manifold. Also provides improved durability. This arrangement also provides constant gap between the modules, which is advantageous for the flow of one of the reactants, the air, between the modules.

A further possibility of module 12C, as shown in FIG. 9, is to provide an arrangement similar to FIGS. 1 to 5 where the first feature 34 comprises a third flat surface 36 and the second feature 42 comprises a fourth flat surface 44 but the fourth flat surface 44 is not arranged parallel to the third flat surface 36. The third flat surface 36 is arranged at an intersecting angle θ to the first flat surface 16 and the fourth flat surface 44 is arranged at an intersecting angle θ to the second flat surface 18. The intersecting angle θ is between 5° and 20°. Preferably the intersecting angle θ is between 10° and 15°. In FIGS. 1 to 5 both of the first and second ends 30 and 38 decrease in thickness between the first and second sides 32 and 40, that is the distance, or thickness, between the third surface 36 and the second surface 18 decreases to produce a decrease in thickness to the first end 30 of the module 12 and likewise the distance, or thickness, between the fourth surface 44 and the first surface 16 decreases such as to produce a decrease in thickness to the second end 38 of the module 12. In this embodiment the first end 30 decreases in thickness between the third surface 36 and the second surface 18 and the second end 38 increases in thickness between the fourth surface 44 and the first surface 16. The arrangement may be arranged to provide a constant gap between the modules 12

Figure 10:
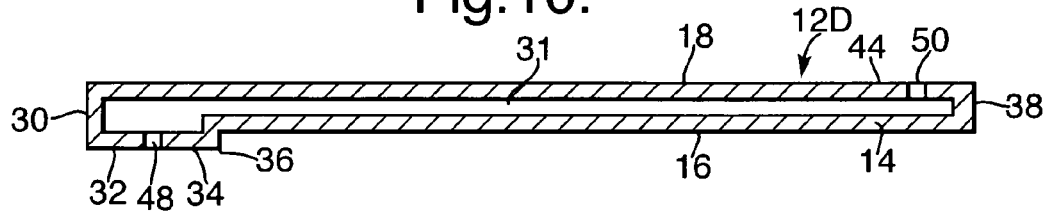
FIG. 10 is a longitudinal cross-sectional view through an alternative module according to the present invention.

Another possibility of module 12D, as shown in FIG. 10, is similar to that shown in FIG. 7 but the fourth flat surface 44 is coplanar with the second flat surface 18.

Figure 11:
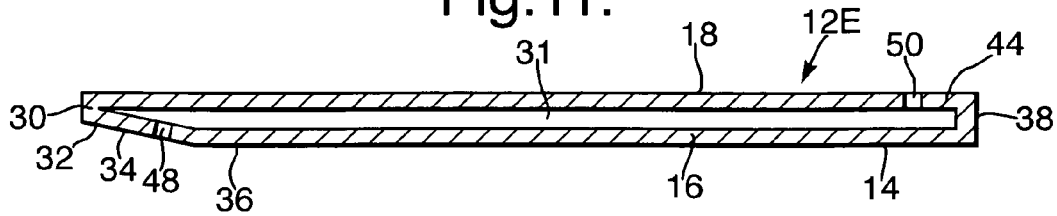
FIG. 11 is a longitudinal cross-sectional view through an alternative module according to the present invention.

Another possibility of module 12E, as shown in FIG. 11, is similar to that shown in FIG. 2 but the fourth flat surface 44 is coplanar with the second flat surface 18.

Figure 12:
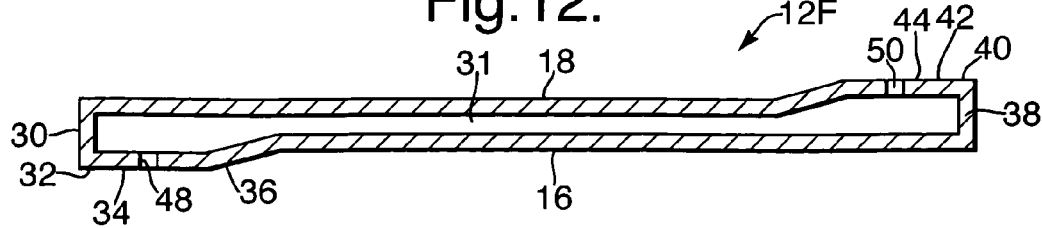
FIG. 12 is a longitudinal cross-sectional view through an alternative module according to the present invention.

A further possibility of module 12F, as shown in FIG. 12, is similar to that shown in FIG. 7 but the there is a ramp between the fourth flat surface 44 and the second flat surface 18 and a ramp between the third flat surface 36 and the first flat surface 16.

It is also possible to use the modules in FIG. 2 or 7 with modules in which both of the ends are coplanar with the first and second surfaces.

Thus the present invention uses at least one flat surface, which is not coplanar with the major flat surface of the module and either the flat surface intersects the major flat surface of the module or the flat surface is parallel to and is spaced, upstanding, from the major flat surface of the module.

Although the present invention has been described with reference to solid oxide fuel cells, the present invention is equally applicable to other types of fuel cells.

Although the present invention has been described with reference to solid oxide fuel cells being provided on all of the modules, it may be possible for at least one of the modules to have a reforming catalyst provided in the at least one passage or on the first and second flat surfaces rather than being provided with fuel cells.

Although the present invention has been described with reference to the modules being connected in serial flow relationship for the flow of fluid, it may be possible for them to be connected in parallel flow.

We claim:

1. A fuel cell stack comprising:
a plurality of modules, each module comprises an elongate hollow member, each module has at least one passage extending longitudinally through the hollow member for the flow of a reactant, each hollow member has a first flat surface and a second flat surface arranged substantially parallel to the first flat surface, a first one of the modules includes a plurality of fuel cells, the fuel cells are arranged on at least one of the first and second flat surfaces of the first one of the modules, a first end of the first one of the modules has a first integral spacer formed integrally with said module to provide space from a second one of the modules, the first integral spacer comprises a third flat surface arranged such that it is non coplanar with the first flat surface of the first one of the modules, a second end of the second one of the modules has a second integral spacer formed integrally with the second one of the modules to provide a spacer with the first one of the modules, the second integral spacer comprises a fourth flat surface arranged such that it is non coplanar with the second flat surface of the second one of the modules, the third flat surface of the first one of the modules is arranged to abut the fourth flat surface of the second one of the modules, the third flat surface has at least one aperture for the flow of reactant, the fourth flat surface has at least one aperture for the flow of reactant and the at least one aperture in the third flat surface is aligned with the at least one aperture in the fourth flat surface to provide a fluid connection between the first and second ones of the modules without additional separate spacers between the first and second ones of the modules.

2. A fuel cell stack as claimed in claim 1, wherein a first end of each module has a first integral spacer formed integrally with said module, a second end of each module has a second integral spacer formed integrally with said module, each first integral spacer comprises a third flat surface arranged such that it is non coplanar with the first surface of said module and each second integral spacer comprises a fourth flat surface arranged such that it is non coplanar with the second surface of said module.

3. A fuel cell stack as claimed in claim 1 wherein the fourth flat surface is arranged parallel to the third flat surface.

4. A fuel cell stack as claimed in claim 1 wherein the third flat surface is arranged at a first intersecting angle to the first flat surface and the fourth flat surface is arranged at a second intersecting angle to the second flat surface.

5. A fuel cell stack as claimed in claim 4 wherein the first end decreases in thickness between the second flat surface and the third flat surface.

6. A fuel cell stack as claimed in claim 5 wherein the first end decreases in thickness between the second flat surface and the third flat surface and the second end decreases in thickness between the first flat surface and the fourth flat surface.

7. A fuel cell stack as claimed in claim 5 wherein the second end increases in thickness between the first flat surface and the fourth flat surface.

8. A fuel cell stack as claimed in claim 4 wherein the first and second intersecting angles are between 5° and 20°.

9. A fuel cell stack as claimed in claim 4 wherein the first and second intersecting angles are between 10° and 15°.

10. A fuel cell stack as claimed in claim 1 wherein the third flat surface is arranged parallel to the first flat surface and the fourth flat surface is arranged parallel to the second flat surface.

11. A fuel cell stack as claimed in claim 1 wherein adjacent modules are connected to allow reactant to flow sequentially through the modules.

12. A fuel cell stack as claimed in claim 1 wherein adjacent modules are connected to allow reactant to flow in parallel through the modules.

13. A fuel cell stack as claimed in claim 1 wherein the fuel cells are solid oxide fuel cells.

14. A fuel cell stack as claimed in claim 1 wherein at least one of the modules has a reforming catalyst provided in the at least one passage or on the first and second flat surfaces.

15. A fuel cell stack as claimed in claim 1 wherein all of the modules have fuel cells.

16. A fuel cell stack as claimed in claim 1 wherein a second end of a further module has a second integral spacer to provide a spacer with the at least one module, the second integral spacer comprises a fourth flat surface arranged such that it is non coplanar with the second flat surface of the further module, the third flat surface of the at least one module abuts the fourth flat surface of the further module.

* * * * *